US006826716B2

United States Patent
Mason (10) Patent No.: US 6,826,716 B2
(45) Date of Patent: Nov. 30, 2004

(54) TEST PROGRAMS FOR ENTERPRISE WEB APPLICATIONS

(75) Inventor: Carlton Keith Mason, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 09/963,712

(22) Filed: Sep. 26, 2001

(65) Prior Publication Data

US 2003/0093717 A1 May 15, 2003

(51) Int. Cl.[7] .............................................. G06F 11/00
(52) U.S. Cl. ........................ 714/38; 713/202; 717/131
(58) Field of Search ......................... 714/38; 713/202; 717/124, 127, 131

(56) References Cited

U.S. PATENT DOCUMENTS

| 5,784,553 A | | 7/1998 | Kolawa et al. ........ 395/183.14 |
| 6,074,431 A | | 6/2000 | Watanabe et al. .............. 717/2 |
| 6,154,844 A | * | 11/2000 | Touboul et al. ............. 713/201 |
| 6,219,829 B1 | | 4/2001 | Sivakumar et al. ............ 717/4 |
| 6,620,204 B1 | * | 9/2003 | Malcolm ..................... 715/513 |
| 2002/0156799 A1 | * | 10/2002 | Markel et al. .............. 707/202 |

* cited by examiner

Primary Examiner—Scott Baderman
Assistant Examiner—Joshua Lohn
(74) Attorney, Agent, or Firm—John R. Biggers; David A. Mims, Jr.; Biggers & Ohanian, LLP (57) ABSTRACT

Testing J2EE applications, wherein J2EE applications comprise modules, the testing including identifying (204), from an application deployment descriptor, modules comprised within the J2EE application; identifying, from an identified module, at least one QOS element; and identifying, from the identified QOS element, a software resource to be tested. Typical embodiments further including generating Java test code; identifying, for the software resource to be tested, a user identification and a user password for a user that is a member of a role intended to protect the software resource; and testing the software resource to be tested by use of the Java test code, including passing as parameters to the Java test code at run time the user identification and user password.

30 Claims, 6 Drawing Sheets

From application.xml

```xml
<module id="WebModule_1">
    <web>
        <web-uri>PBSecFVTServlet1.war</web-uri>
        <context-root>/secfvt/servlets/basicauth</context-root>
    </web>
</module>

<module id="EjbModule_4">
    <ejb>SecFVTS4EJB.jar</ejb>
    <alt-dd></alt-dd>
</module>

<security-role id="SecurityRole_1">
    <description>Manager in an enterprise</description>
    <role-name>Manager</role-name>
</security-role>
```

FIG. 5

From web.xml

```xml
<security-constraint id="SecurityConstraint_1">
    <web-resource-collection id="WebResourceCollection_1">
        <web-resource-name>Protected Area</web-resource-name>
        <url-pattern>/SecFVTServlet1/*</url-pattern>
        <http-method>DELETE</http-method>
        <http-method>GET</http-method>
        <http-method>POST</http-method>
        <http-method>PUT</http-method>
    </web-resource-collection>
    <auth-constraint id="AuthConstraint_1">
        <role-name>Manager</role-name>
        <role-name>Employee</role-name>
    </auth-constraint>
</security-constraint>
```

FIG. 6

From an ejb-jar.xml:

```xml
<method-permission id="MethodPermission_1">
        <description>Allow AllAuthenticated users to create
            SecFVTS1EJB</description>
        <role-name>AllAuthenticated</role-name>
        <method id="MethodElement_1">
            <ejb-name>SecFVTS1EJB</ejb-name>
            <method-intf>Home</method-intf>
            <method-name>create</method-name>
            <method-params>
                <method-param>java.lang.String</method-param>
            </method-params>
        </method>
</method-permission>

<enterprise-beans>
    <session id="Session_1">
        <description>Security FVT Stateful Session Bean Test
            #1</description>
        <display-name>SecFVTS1EJB</display-name>
        <small-icon></small-icon>
        <large-icon></large-icon>
        <ejb-name>SecFVTS1EJB</ejb-name>
        <home>com.ibm.ws.secfvt.jars.ejb.SecFVTS1Home</home>
        <remote>com.ibm.ws.secfvt.jars.ejb.SecFVTS1</remote>
        <ejb-class>com.ibm.ws.secfvt.jars.ejb.SecFVTS1EJB</ejb-class>
        <session-type>Stateful</session-type>
        <transaction-type>Bean</transaction-type>
        <security-role-ref id="SecurityRoleRef_1">
            <description>Used for principal verification</description>
            <role-name>Emp</role-name>
            <role-link>Employee</role-link>
        </security-role-ref>
        <security-role-ref id="SecurityRoleRef_2">
            <description>Used for principal verification</description>
            <role-name>Mgr</role-name>
            <role-link>Manager</role-link>
        </security-role-ref>
    </session>
</enterprise-beans>
```

FIG. 7

TEST PROGRAMS FOR ENTERPRISE WEB APPLICATIONS

BACKGROUND OF THE INVENTION

1. Field of the Invention

The field of the invention is data processing, or, more specifically, methods, systems, and products for generating test programs for J2EE Java Enterprise web applications.

2. Description of Related Art

Enterprise Web Applications are increasingly complex, mission critical, and important revenue generators for many corporations in many different industries. Testing such applications to verify their correctness, reliability, availability, and security is an important part of the overall engineering effort required to produce and deploy them. Developing these test or verification programs is typically a manual, labor intensive software development effort in itself. These tests must be maintained along with the Enterprise Web Application such that if an enhancement or modification is made to the Web Application, the tests are also modified and executed to test the enhancement or modification.

Java 2 Enterprise Edition (J2EE) is a set of technologies and specifications developed by Sun Microsystems and supported by many computer and software vendors, including for example, IBM, BEA, and Oracle) as a leading platform for developing and deploying enterprise web applications. The J2EE specifications specify a declarative programming model where many attributes (transaction requirements and semantics, security constraints and roles, lifecycle characteristics, persistence mechanisms, and other quality of service attributes of the Enterprise Application are captured in ascii XML files call ed deployment descriptors (DDs). DDs are used by the J2EE runtime execution environment to provide and enforce the quality of service attributes described in the DD.

A J2EE application consists of one or more J2EE modules and one J2EE application deployment descriptor. An application deployment descriptor contains a list of the application's modules and information on how to customize the application. A J2EE application is packaged as a Java Archive (JAR) file with an ear (Enterprise archive) extension. A J2EE module consists of one or more J2EE components for the same container type and one component deployment descriptor of that type. A component deployment descriptor contains declarative data to customize the components in the module. A J2EE module without an application deployment descriptor can be deployed as a stand-alone J2EE module.

The three types of J2EE modules are:

Enterprise JavaBeans modules contain class files for enterprise beans and an EJB deployment descriptor. EJB modules are packaged as JAR files with a jar extension.

Web modules contain JSP files, class files for servlets, GIF and HTML files, and a Web deployment descriptor. Web modules are packaged as JAR files with a war (Web archive) extension.

Application client modules contain class files and an application client deployment descriptor. Application client modules are packaged as JAR files with a jar extension.

Central to the J2EE component-based development model is the notion of containers. Containers are standardized runtime environments that provide specific component services. In addition, containers provide a mechanism for selecting application behaviors at assembly or deployment time. Through the use of deployment descriptors (text files that specify component behavior in terms of well-defined XML tags), components can be configured to a specific container's environment when deployed, rather than in component code. Features that can be configured at deployment time include security checks, transaction control, and other management responsibilities.

A few background definitions: "Quality-of-service" or "QOS" refers to the application behaviors or XML tags related to the security or transaction control aspects of an enterprise application. "DD" is an acronym for deployment descriptor. An XML parser is a software tool capable of reading an XML document and breaking down XML elements into usable parts. There are many Java XML parsers available, including, for example, the Apache Software Foundations Xerces, Oracle's XML Parser, and IBM's XML4J.

"Application.xml" is a filename used to denote an application deployment descriptor file for an J2EE application. "Web.xml" is a filename typically used to denote a deployment descriptor file for a Web module in a J2EE application. "Ejb-jar.xml" is a filename typically used to denote a deployment descriptor file for an EJB module in a J2EE application.

"URI" or "URL" refers to Uniform Resource Identifier or Uniform Resource Locator, the standard method of locating and identifying distributed resources on the World Wide Web.

A "role" or "security role" is a classification of the type of identity required to access a protected resource. Roles specified in deployment descriptors are typically associated with EJB methods and WEB URIs. When a J2EE application is deployed or installed, an administrator maps actual users and/or groups to the roles. The security code in either the web or EJB container inspects the role that the requesting user is in, and, if it matches any of the roles associated with a URI or EJB method, then the user is in the role and access is permitted.

For more background information regarding J2EE, readers are referred to the Sun Systems' publication, *Designing Enterprise Applications with the Java 2 Platform, Enterprise Edition*, by Nicholas Kassem, ISBN 0-20-1702770.

Within the J2EE environment and system itself, there is no systemic structure or method for generating test code for J2EE applications. In the current state of the J2EE art, Java test code for J2EE applications is developed by hand. It would be advantageous for several reasons, however, to have the ability to automatically generate test programs because the generation of test programs is more efficient, potentially more accurate, potentially more complete, and less labor intensive than manually developing test programs. Generated test programs would have the advantage of covering or verifying more combination of actions, web application configurations or scenarios than can be practically developed otherwise. Automatic generation of tests programs would have the advantage of easing the maintenance burden of the web application over time.

SUMMARY

Exemplary embodiments of the invention typically include a method of testing a J2EE application, wherein the J2EE application comprises modules. Exemplary embodiments typically include identifying, from an application deployment descriptor, modules comprised within the J2EE application, identifying, from an identified module, at least one QOS element, and identifying, from the identified QOS element, a software resource to be tested. Other exemplary embodiments typically include generating Java test code, identifying, for the software resource to be tested, a user identification and a user password for a user that is a member of a role intended to protect the software resource, and testing the software resource to be tested by use of the Java test code, including passing as parameters to the Java test code at run time the user identification and user password.

Exemplary embodiments of the invention typically include at least one of the identified modules having a web module having a web module deployment descriptor, and at least one of the identified QOS elements having a security-constraint element. Exemplary embodiments typically include identifying a software resource to be tested, constructing, from a <web-uri> element in the application deployment descriptor and from a <url-pattern> element in the web module deployment descriptor, a URI that identifies a software resource to be tested, and testing the software resource by use of the Java test code. In exemplary embodiments, testing the software resource typically includes passing as a parameter to the Java test code at run time the URI, invoking the URI wherein the invoking includes transmitting an HTTP request, wherein the HTTP request includes the URI, the user identification, and the user password, receiving an HTTP response, and determining in dependence upon the HTTP response whether the software resource is protected.

Exemplary embodiments of the invention typically include at least one of the identified modules having an Enterprise JavaBean module ("EJB module") with a deployment descriptor, and at least one of the identified QOS elements having a <method-permission> restraint element. In exemplary embodiments, the <method-permission> restraint element typically includes a first <method-name> sub-element having a first <method-name> sub-element value, and a first <ejb-name> sub-element having a first <ejb-name> sub-element value. Exemplary embodiments typically include the identified software resource to be tested having a JavaBean method. In typical embodiments, the JavaBean method includes identifying a software resource to be tested and finding in a deployment descriptor for the identified EJB module one or more <enterprise-bean> elements having nested <ejb-name> sub-elements having values equal to the first <ejb-name> sub-element value.

In typical embodiments, each found <enterprise-bean> element includes the nested <ejb-name> sub-element, a <home> nested sub-element, a <remote> nested sub-element, and an <ejb-class> nested sub-element. Other exemplary embodiments typically include identifying, for each found <enterprise-bean> element, by use of Java reflection and the value of the <ejb-class> element, a method signature having a method name equal to the first <method-name> sub-element value; and testing the software resource by use of the Java test code. In typical embodiments, testing the software resource includes passing as a parameter to the Java test code at run time the JNDI name for the JavaBean method, logging in to an application environment by use of the user identification and the user password, and looking up the JavaBean home by use of a JNDI home name for the software resource. In typical embodiment, testing the software resource also includes creating, by use of the JavaBean home, an instance of the JavaBean, invoking, in the created instance, the protected JavaBean method, and reporting whether invoking the protected JavaBean method succeeded.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 7 is an excerpt from an exemplary deployment descriptor for an EJB module.

DETAILED DESCRIPTION OF EXEMPLARY EMBODIMENTS

Introduction

The present invention is described to a large extent in this specification in terms of methods for generating test programs for enterprise web applications. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the following terms are used as defined here. Other terms are defined elsewhere in the specification and used as defined.

In this specification, the terms "field," "data element," and "attribute" are used as synonyms, referring to individual elements of digital data. Aggregates of data elements are referred to as "records" or "data structures." Aggregates of records are referred to as "files" or "tables." Aggregates of files are referred to as "databases." Definitions of complex data structures that include member methods, functions, or software routines in addition to data elements are referred to as "classes." Instances of complex data structures are referred to as "objects" or "class objects."

"API" means Application Program Interface, a set of software routines and tools for building software applications. APIs particularly include standardized "interfaces," standard sets of program calls with parameters for accessing particular software functions, hence the term "Interface." The particular software functions typically are located or contained within software systems typically called applications, hence the term "Application." APIs makes it easier to develop a program by providing such useful building blocks. Programmers put the blocks together, hence the term "Program" in Application Program Interface.

"Browser" means a Web browser, a software application for locating and displaying Web pages. Typical browsers today can display text, graphics, audio and video.

"Coupled for data communications" means any form of data communications, wireless, infrared, radio, internet protocols, HTTP protocols, email protocols, networked, direct connections, dedicated phone lines, dial-ups, serial connections with RS-232 or Universal Serial Buses, hard-wired parallel port connections, and other forms of data communications as will occur to those of skill in the art.

Couplings for data communications wireless modems using analog cellular channels, and communications using CDPD, Cellular Digital Packet Data. Couplings for data communications include wireless access points, wireless network ports according to IEEE standard 802.11, and Bluetooth piconet ports as standardized by the Bluetooth Special Interest Group, and HomeRF ports as standardized by the HomeRF Working Group, as well as infrared ports. Couplings for data communications include Bluetooth piconets implemented in accordance with the well known de facto industry standard known as the "Bluetooth Specification," a specification for short range radio links among mobile personal computers, mobile phones, and other portable devices.

"Element" refers to a markup language elements, such elements being delimited by tags. HTML elements are defined in the standard HTML specification. XML elements are capable of being defined by programmers or authors.

"HTTP" means HyperText Transfer Protocol, the principal data communications protocol used by the Web. HTTP defines how Web messages are formatted and transmitted and what actions Web servers and browsers are to take in response to various HTTP messages. Entering a URL in a browser, for example, typically results in transmission of an HTTP request message directing an HTTP server to fetch and transmit to the requesting browser an HTML document identified in the URL.

"HTML" means HyperText Markup Language, a tagged language used to create documents for use on the Web. HTML is related to XML in that they are both tagged languages.

"JavaBean" is a specification developed by Sun Microsystems that defines how Java objects interact. An object that conforms to this specification is called a "JavaBean." JavaBeans can be compared to Microsoft's ActiveX controls in that a JavaBean can be used by any application that understands the JavaBeans format. Unlike ActiveX controls, however, which can only function in a Microsoft Windows environment, JavaBeans can be used on any platform that supports Java, which today is almost any computer platform or environment. "JavaBean" is a trademark of Sun Microsystem, Inc.

"LDAP" stands for Lightweight Directory Access Protocol, an increasingly popular set of protocols for accessing information directories. Part of the reason that LDAP is increasingly popular is that it supports TCP/IP, an extremely useful quality for Internet access.

The term "network" is used in this specification to mean any networked coupling for data communications. Examples of networks useful with the invention include intranets, extranets, internets, local area networks, wide area networks, and other network arrangements as will occur to those of skill in the art. The use of any networked coupling among virtual cameras, electronic photo shops, and devices coupled through designated network addresses is well within the scope of the present invention. In embodiments of the kind illustrated, virtual camera typically includes devices implemented as automated computing machinery, a Web browser, and an internet client having a network address. There is no requirement within the present invention that the internet client have any particular kind of network address.

"Network address" means any network address useful to locate a virtual camera or a designated network address on any network. Network address includes any internet protocol address useful to locate an internet client, a browser, a virtual camera, or a designated network address on the Internet. Network addresses useful with various embodiments of the invention include local internet protocol addresses, private internet protocol addresses, and temporary Internet addresses assigned to a Web client by a DHCP server, and permanent, official registered Internet addresses associated with domain names.

Java provides mechanisms for Java programs to discover information about Java programs at run time. Two such mechanisms are known as "Reflection" and "Introspection." Java "Reflection" is the process of looking at a JavaBean during run time by use of Java Reflection APIs in order to understand the features or properties of the JavaBean. "Introspection" is learning about the properties of a JavaBean by calling methods from a "BeanInfo" interface, for JavaBeans that have implemented that interface.

A "store" is one or more storage locations in computer memory. "Storing" is writing data to storage locations in computer memory, typically implemented by a processor operating under stored program control.

A "tag" is a delimiter in a markup language. Tags delimit markup language elements.

"URI" means Uniform Resource Identifier, a method of identifying World Wide Web data with network addresses for data communications. "URI" is a generic term for all types of names and addresses that refer to objects on the World Wide Web. "URL" means Uniform Resource Locator, a standard method of associating World Wide Web data locations with network addresses for data communications. A URL is one kind of URI.

"World Wide Web," or, more simply, "the Web," refers to the system of internet protocol ("IP") servers that support specially formatted documents, documents formatted in a language called "HTML" for HyperText Markup Language. The term "Web" is used in this specification also to refer to any server or connected group or interconnected groups of servers that implement the HyperText Transport Protocol, "HTTP," in support of URLs and HTML documents, regardless whether such servers or groups of servers are coupled to the World Wide Web as such.

A "Web site" is a location on the World Wide Web. Web sites are identified by domain names that resolve to Internet addresses. Web sites include storage locations identifiable by URLs. Web sites are implemented in, on, and as part of Web servers, that is, HTTP servers. Web sites are aggregations of computer software installed and operating on computer hardware.

"XML" means "Extensible Markup Language," a specification developed by the World Wide Web Consortium or "W3C." XML is a tagged language like HTML. XML, therefore, superficially resembles HTML, but XML is not HTML. Unlike HTML, XML is designed purely to implement text descriptions of formatted data. That is, unlike HTML, XML itself implements no measures for formatting or display of the contents of XML documents. XML, unlike HTML, is extensible, allowing programmers or authors to create or define customized tags, enabling definition, translation, transmission, validation, and interpretation of data among applications and organization. As an extensible language, XML functions as a metalanguage in which defining additional tags effectively represents defining additional languages. That is, an author's defining the author's own custom tag set is effectively designing the author's own markup language.

Because XML itself is limited in functionality to describing formatted data, a family of technologies is defined in relation to extend functionality in relation to XML. "Xlink," for example, is intended to describe a standard way to add hyperlinks to XML files. "XFragments" is an emerging standard for pointing internally to parts of an XML document. The Extensible Style Language or "XSL" is an advanced language for expressing style sheets, to provide the formatting for output that is otherwise absent from XML itself. XSL is used to implement Extensible Style Language Transformations or "XSLT," a transformation language for rearranging, adding or deleting tags & attributes. The Document Object Model or "DOM" is a standard set of function calls for manipulating XML files from a programming language. "XML Namespaces" is a specification for associating URLs with tags and attributes in XML documents. As of this writing, there are many additional tools, modules, extensions, and related standards under development for XML.

DETAILED DESCRIPTION

As mentioned in the background discussion above, deployment descriptors are normally intended in the J2EE environment for use by containers. Embodiments of the present invention, however, as described in more detail below, typically use the information in the J2EE deployment descriptors to generate client tests targeted towards specific QOS attributes of the application that are running in the containers.

Figure 1:
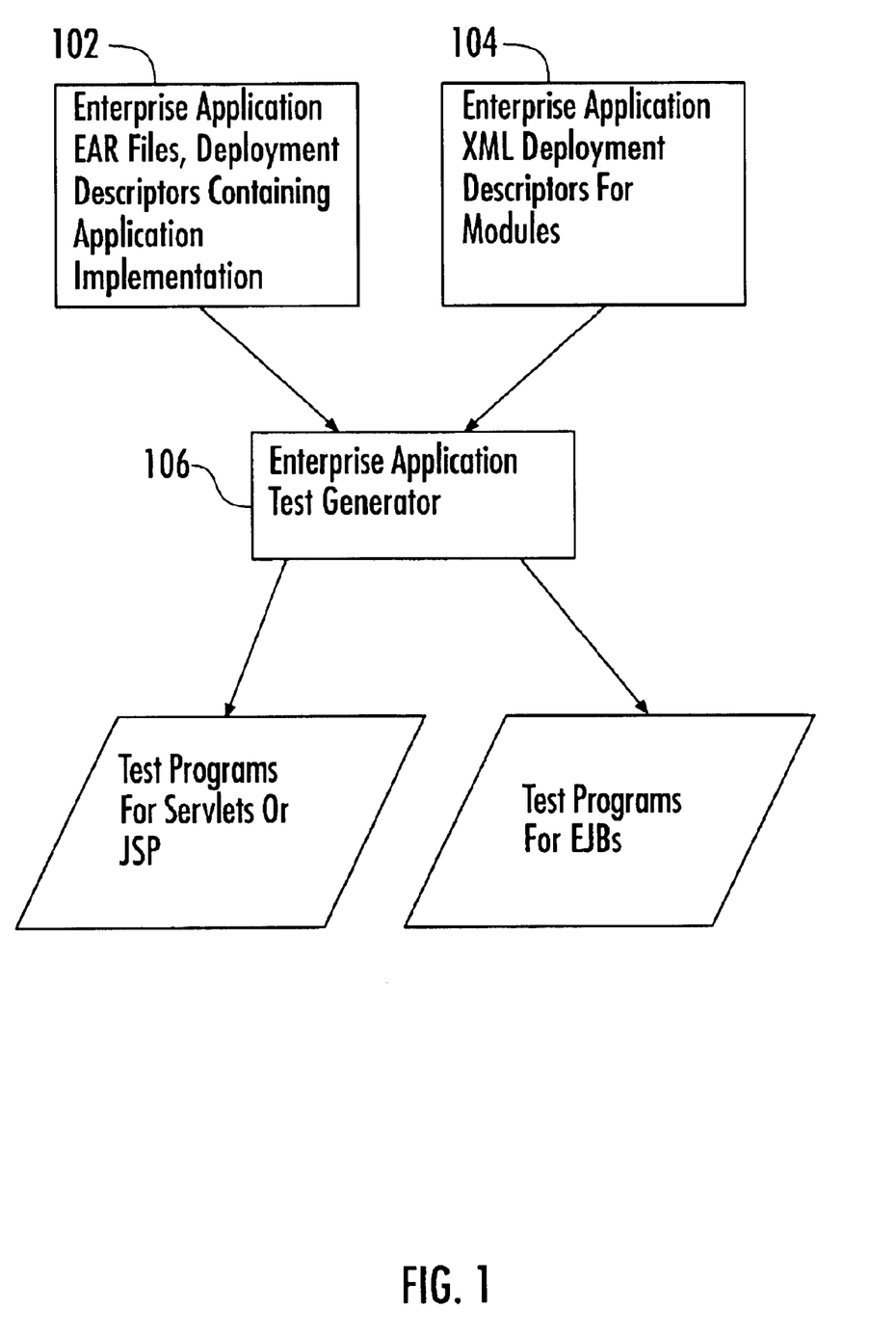
FIG. 1 is a block diagram of an exemplary embodiment of a system for testing J2EE applications.

Turning to FIG. 1, an example embodiment is illustrated as a system having an enterprise application test generator (106) for generating test program for Java servlets and for Java Server Pages ("JSPs") as well as test programs for enterprise JavaBeans ("EJBs"). The enterprise application test generator (106) in the illustrated embodiment operates by reading application deployment descriptors (102) and module deployment descriptors (104).

In fact, typical embodiments of the present invention generate various test programs for the enterprise web application by reading the J2EE deployment descriptors and Java class files that contain the implementation of the software components that implement the enterprise web application. Embodiments typically use the knowledge and details declared in the server side XML deployment descriptors to intelligently generate tests which when combined with the implementation of the enterprise applications' java .class files, java introspection and /or reflection is used to actually generate compilable test code.

Figure 2:
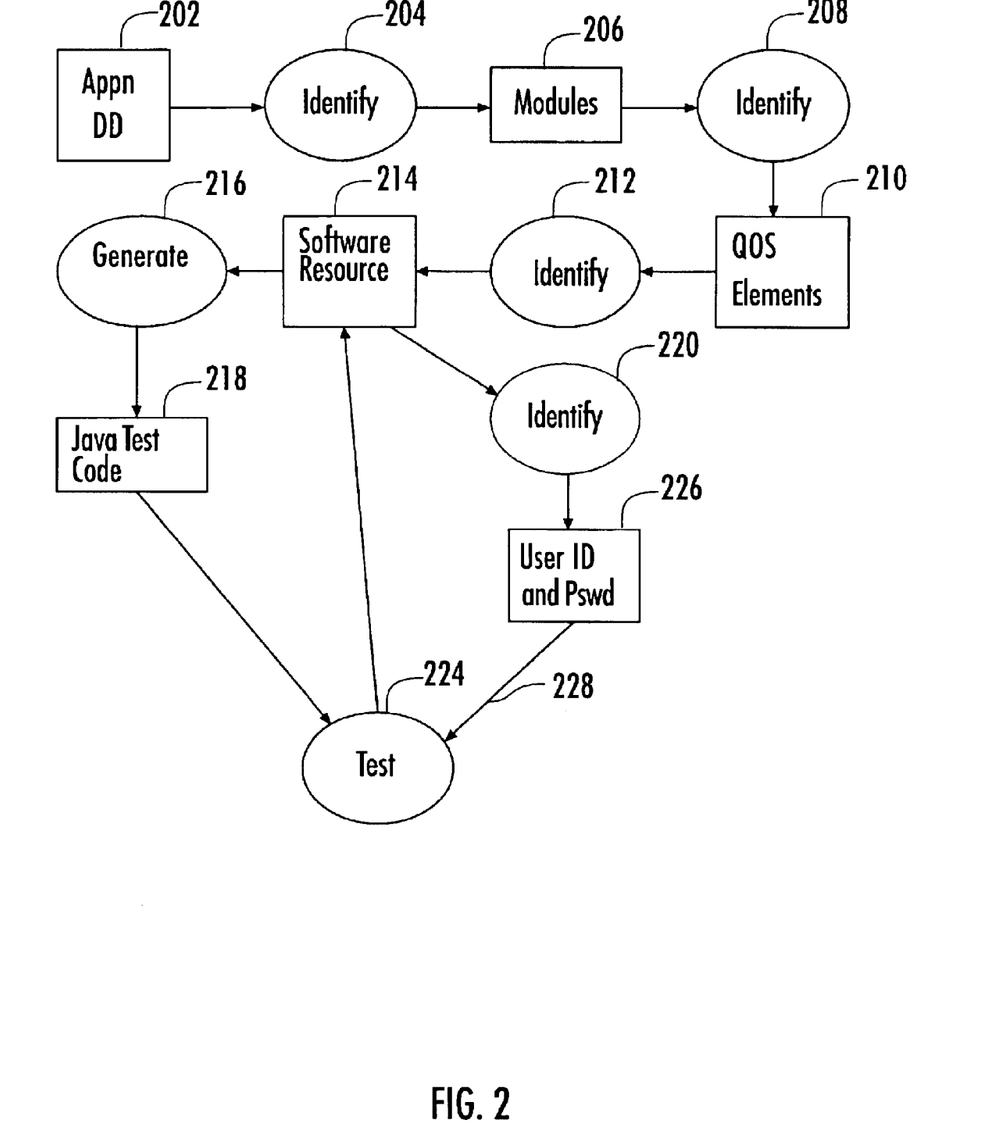
FIG. 2 is a control flow diagram of an exemplary embodiment of a method for testing J2EE applications.

Turning now to FIG. 2, typical embodiments of the invention are illustrated as a method of testing a J2EE application. J2EE applications comprise modules. In typical embodiments, the method as illustrated includes identifying (204), from an application deployment descriptor (202), modules (206) comprised within the J2EE application. The illustrated example embodiment includes identifying (208), from an identified module (206), at least one QOS element (210), and identifying (212), from the identified QOS element (210), a software resource (214) to be tested. In typical embodiments, the method, as shown, further includes generating (216) Java test code (218). Typical exemplary embodiments also include identifying (220), for the software resource to be tested (214), a user identification and a user password (226) for a user that is a member of a role intended to protect the software resource, and testing (224) the software resource to be tested (214) by use of the Java test code, including passing (228) as parameters to the Java test code at run time the user identification and user password (226).

More specifically, useful exemplary embodiments of the present invention typically operate as illustrated by the following pseudocode:

```
GEN_SECURITY_TEST(INPUT EAR_file, OUTPUT Java test code)
{
    Unzip_EAR_File(EAR_file); // (See routine definition below)
    // read elements and disperse into a tree structure in memory
    Parse application.xml into memory(UnzippedEAR_File);
    For Each web and EJB module specified in application.xml:
        parse the web and/or EJB moduler's web.xml or ejb-jar.xml into
        memory.
    For Each parsed web module in parsed memory:
    {
        Scan for security-constraint elements;
        For Each security-constraint element
            Generate Java code to test protected URL
            (see code gen note 1)
    }
    For Each parsed EJB module:
    {
        Scan for method-permission elements;
        For Each method-permission element:
        {
            Open Java .class file for EJB and reflect on the EJB
                class to discover method signature and return
                type.
            Generate Java code to test protected EJB method (see
                code gen note 2)
        }
    }
}// End GEN_SECURITY_TEST
// Routine: Unzip_EAR_File
// Purpose: Given an enterpise application packaged in a .ear file,
//   recursively unpackage it to the file system so its composite parts,
//   and their component parts, such as XML deployment descriptor files
//   and Java .class files, are available for further processing.
Unzip_EAR_File (INPUT EAR_file)
{
    Unzip/decompress EAR_file into the filesystem thus making its
        contents available
    For each nested EJB or Web module now in the file system, unzip
        them as well.
}
```

Figure 3:
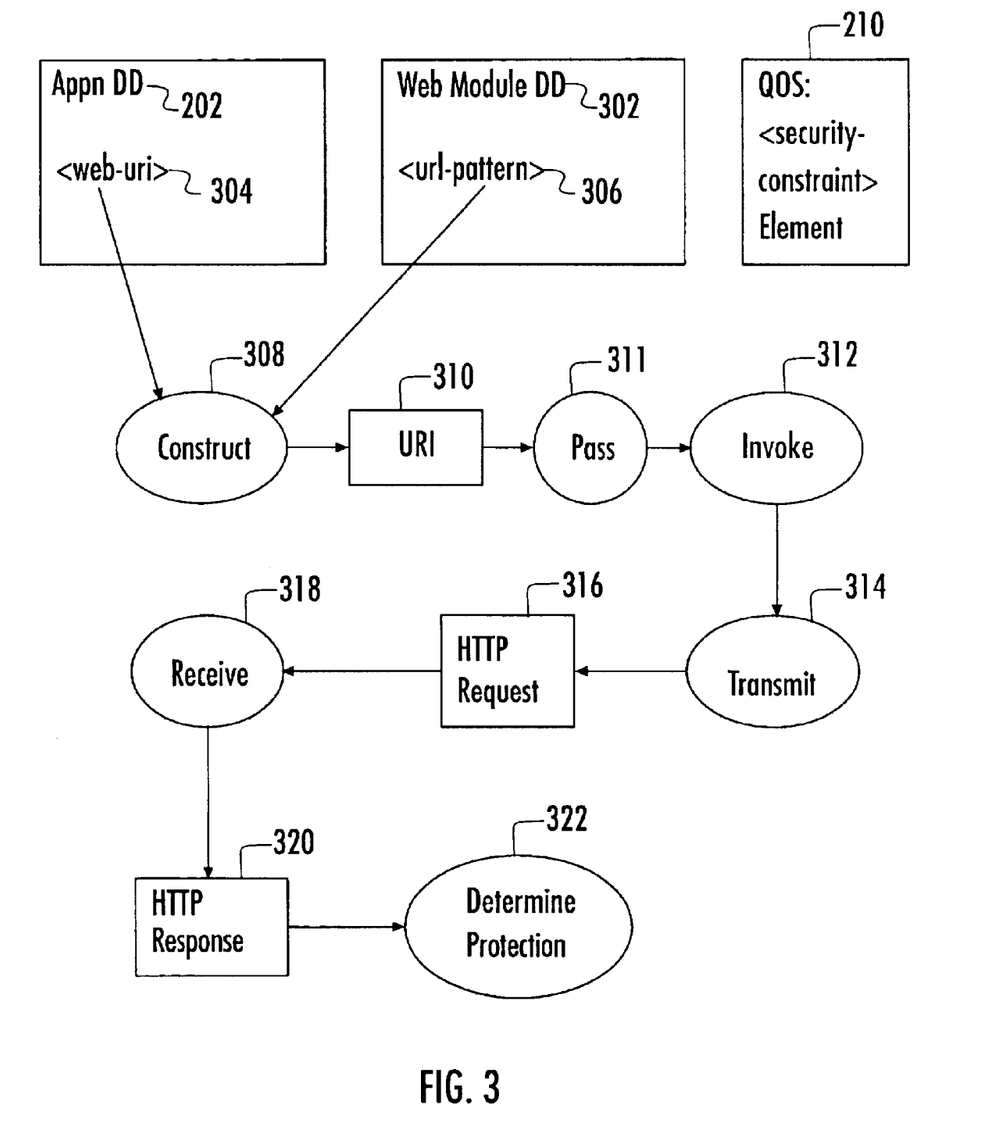
FIG. 3 is a control flow diagram of an exemplary embodiment of a method for testing J2EE applications wherein software resources to be tested include web resources.

Turning now to FIG. 3, a more detailed exemplary embodiment is seen in which at least one of the identified modules includes a web module having a web module deployment descriptor (302). In the more detailed exemplary embodiment of FIG. 3, at least one of the identified QOS elements comprises a security-constraint element (210), and identifying a software resource to be tested includes constructing (308), from a <web-uri> element (304) in the application deployment descriptor (202) and from a <url-pattern> element (306) in the web module deployment descriptor (302), a URI (310) that identifies a software resource to be tested.

Other exemplary embodiments, also illustrated by FIG. 3, typically include testing the software resource by use of the Java test code. In typical embodiments testing the software resource includes passing (311) as a parameter to the Java test code at run time the URI (310), and invoking (312) the URI wherein the invoking includes transmitting (314) an HTTP request (316). The HTTP request typically includes, for example, the URI, the user identification, and the user password. Further exemplary embodiments typically include receiving (318) an HTTP response (320), and determining (322) in dependence upon the HTTP response whether the software resource is protected.

Generating the web security test code typically depends upon the construction of the URIs identifying software resources intended to be protected or secured and the security roles necessary for accessing the secure URIs. Unlike EJB modules, in generating test code for web modules, it is not necessary to utilize Java reflection or introspection on the Java class files that contain the implementation for servlets because the servlet interface is standard and because servlets respond to the standard HTTP protocol.

In typical embodiments, therefore, a URI for a J2EE web module is constructed from information defined in the application.xml (e.g. the context-root element of the servlet or JSP) and from information in the web.xml (e.g. the security-constraint element and nested url-pattern). At the point where we generate web test code we know the name of the web module from the application.xml and the security-constraint in the web.xml file that we are currently processing. More specifically, in many embodiments of the kind under discussion, URIs are constructed as illustrated in the following exemplary pseudocode:

```
build_protected_URI(INPUT <security-constraint> element,
        INPUT web-module name,
        OUTPUT Protected_URI)
{
    Scan parsed application.xml for <web> element that contains a nested
        <web-uri> element whose value equals the web module name
        we are processing;
    Extract and save the value of the <context-root>
    element in a variable,
        VAR_CONTEXT_ROOT;
    Scan parsed web.xml for input web-module name for the value of the
        <url-pattern> element which is a nested sub-element of the
        <security-constraint> element that we are currently processing
        and save this value into the variable VAR_URL_PATTERN;
    Protected_URI = VAR_CONTEXT_ROOT +
        VAR_URL_PATTERN
}
```

Figure 5:
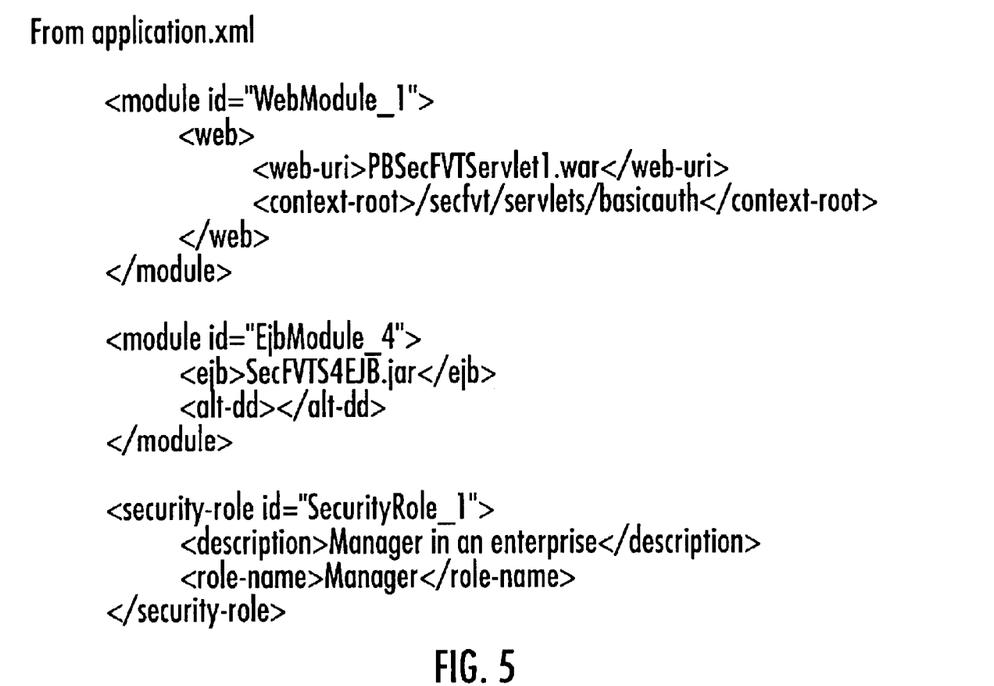
FIG. 5 is an excerpt from an exemplary application deployment descriptor.
Figure 6:
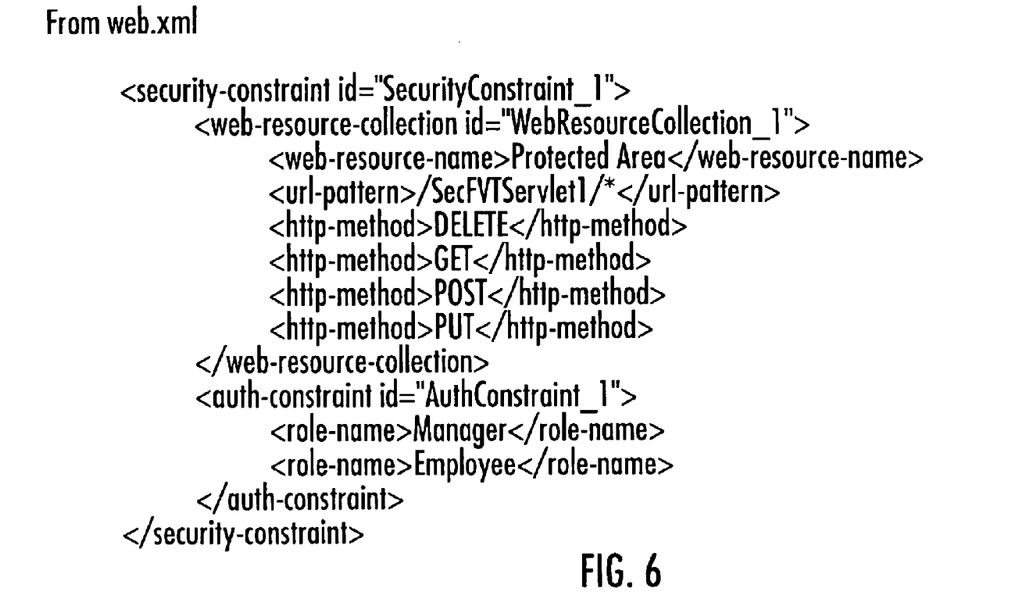
FIG. 6 is an excerpt from an exemplary deployment descriptor for a web module.

In an even more specific example, based upon the excerpts from deployment descriptors set forth in FIGS. 5 and 6, a URI to generate test code for would be: /secfvt/servlets/basicauth/SecFVTServlet1. In this specific example, the context-root of this example URI is: /secfvt/servlets/basicauth, and the url-pattern is: /SecFVTServlet1.

To form a URI that can be used to access a protected resource, typical embodiments also add the HTTP protocol and optional port identifier, concatenating them into the URI. The port identifier, being site-specific, typically is not provided in J2EE.ear files or application deployment descriptors, but is provided instead as a run time parameter to the test execution. A complete example URI, therefore, that would be useful during the test for this example embodiment would be: http://server1:80/secfvt/servlets/basicauth/SecFVTServlet1.

Generated test code for such an exemplary URI typically uses the HTTP protocol and the URI to attempt to access protected web resources. Although the generated code is Java, it uses the HTTP protocol to simulate the interactions of a web browser with a protected URI. More specifically, typically exemplary embodiments of generated test code, use, for example, an open source Java library, called HttpUnit, which provides routines that allow a Java program to programmatically act as a web browser, as illustrated in the following exemplary pseudocode:

```
// Regarding input parameters: userID is a user identifierfor a user that is a
// member of the role protecting a URI; webServerName is an example
// web server name such as "ww.foo.com"; httpPort is for example as well
// known port such as ":80" or in some embodiments is left null;
// generatedProtectedURI is the URI generated from the test generator
protected void testProtectedURI(    String userID,
                                    String password,
                                    String webServerName,
                                    String httpPort,
                                    String generatedProtectedURI )
{
    String _httpPort = "";
    String _protectedURI = null;
    if(httpPort != null) _httpPort = httpPort;
    // Create the full HTTP protected URI name to
    // test from the supplied inputs
    _protectedURI = "http://" + webServerName + _httpPort +
                    generatedProtectedURI;
// HttpUnit calls used to setup a browser-style
// data communications session
WebConversation    conversation = new WebConversation( );
WebRequest request = new GetMethodWebRequest(_protectedURI);
WebResponse response;
try
{
        // This is the method call that attempts to
        // access the protected web resource
        response = conversation.getResponse(request);
}
catch (com.meterware.httpunit.AuthorizationRequiredException ae)
{
        // We expect this exception if we have never
        // logged in before. This is the expected result.
        // It verifies that the web resource
        // is indeed protected.
        // Now login with a valid user id and password.
        conversation.setAuthorization(userID, password);
        try
        {
                // Now try to get the web resource again now
                // that we have authenticated. If the user belongs
                // to the role that is protecting the web resource,
                // then we should not get an exception.
                response = conversation.getResponse(request);
        }
        catch (Exception e1)
        {
                fail("UnExpected exception:" + e1);
                e1.printStackTrace( );
                return;
        }
}
System.out.println("Test successful");
}
```

Mapping users or groups to security roles typically is accomplished when an enterprise application is deployed or installed in the runtime environment. Users' or groups' association with security roles does not necessarily appear in any deployment descriptors. The test code generator, therefore, in typical embodiments often cannot automatically generate test code that includes specific users, or user groups, and associates security roles governing access to web resources. For all these reasons, to verify that a particular role is required to access a protected URI, a user identifier or 'user-id' in the runtime environment that has been mapped to a security role defined in a deployment descriptor, in many embodiments, is passed as a run time parameter to the generated Java test code. The test code then uses the supplied user-id when challenged to authenticate its request for access to the protected resource.

Figure 4:
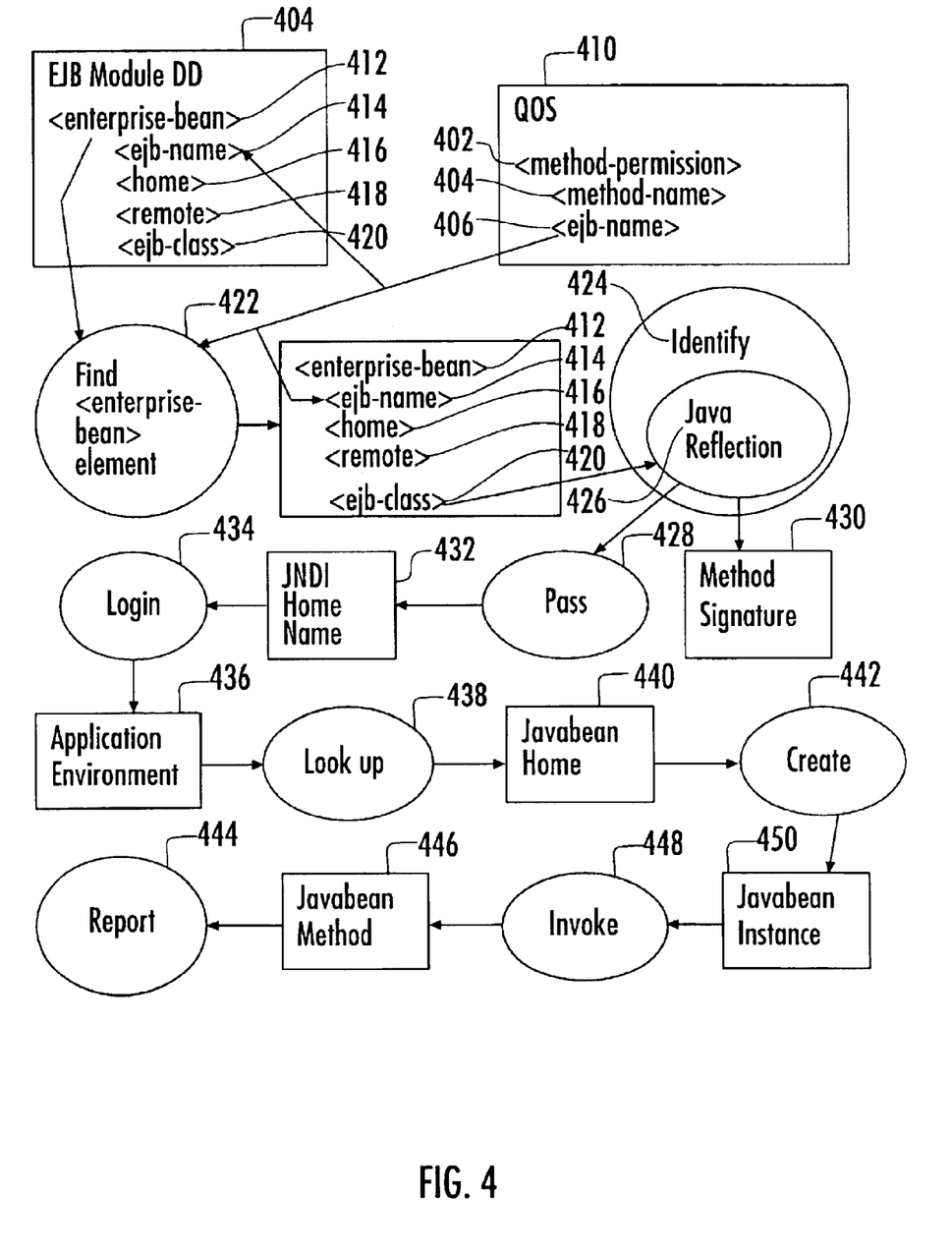
FIG. 4 is a control flow diagram of an exemplary embodiment of a method for testing J2EE applications wherein software resources to be tested include Enterprise JavaBean methods.

Turning now to FIG. 4, an additional detailed exemplary embodiment is seen in which at least one of the identified modules comprises an Enterprise JavaBean module ("EJB module") having a deployment descriptor (404). In the kind of embodiment illustrated in FIG. 4, at least one of the identified QOS elements has a <method-permission> restraint element (402). In typical embodiments of this kind, the <method-permission> restraint element includes a first <method-name> sub-element (404) having a first <method-name> sub-element value, and a first <ejb-name> sub-element (406) having a first <ejb-name> sub-element value.

In a further exemplary embodiment, also illustrated by use of FIG. 4, the identified software resource to be tested includes a JavaBean method. In typical embodiments of the kinds shown in FIG. 4, identifying a software resource includes finding (422) in a deployment descriptor for the identified EJB module (404) one or more <enterprise-bean> elements (412) having nested <ejb-name> sub-elements (414) having values equal to the first <ejb-name> (406) sub-element value. In embodiments of this kind, each found <enterprise-bean> element typically includes the nested <ejb-name> sub-element (414), a <home> nested sub-element (416), a <remote> nested sub-element (418), and an <ejb-class> nested sub-element (420). Such embodiments typically include identifying (424), for each found <enterprise-bean> element (412), by use of Java reflection (426) and the value of the <ejb-class> element (420), a method signature (430) having a method name equal to the first <method-name> sub-element (404) value.

In typical embodiments, in a <method-permission> element in an ejb-jar.xml file, a nested <method> element provides additional nested sub-elements that describe the number and type or arguments that the method accepts. In many cases, this is all the information needed to generate the test code necessary to invoke the protected method. The <method> element provides sub-elements describing particular parameters because in Java, in a fashion similar to other object oriented languages such as C++, a method may be overloaded. "Overloading" means that more than one method can have the exact same name, and methods having the same name are distinguished according to the parameters they accept. In other words, within a JavaBean, more than one member method can have the same name as long as the number and type of parameters are different. For example, the two methods named methodA(String a, String b) and methodA(String a) are an example of an overloaded method each of which could have a different permission associated with it.

Here are two pseudcocode examples of excerpts from an ejb-jar.xml file showing an overloaded method called "employee" where one method takes no parameters. That is, in one <method> element, the <method-params> element has no specified value, and in other <method> element, the <method-params> element specifies a single java.lang.String argument:

```
<method-permission id="MethodPermission_2">
    <description></description>
    <role-name>AllAuthenticated</role-name>
    <method id="MethodElement_2">
        <ejb-name>SecFVTS1EJB</ejb-name>
        <method-intf>Remote</method-intf>
        <method-name>employee</method-name>
        <method-params>
            <method-param>java.lang.String</method-param>
        </method-params>
    </method>
    <method id="MethodElement_3">
        <ejb-name>SecFVTS1EJB</ejb-name>
        <method-intf>Remote</method-intf>
        <method-name>employee</method-name>
        <method-params></method-params>
    </method>
```

Because so much information is provided by the deployment descriptors, Java reflection is not a general requirement of the present invention. In many embodiments, the deployment descriptor itself will provide all the information needed to generate test code. Java reflection, however, does provide more information about a class and its methods, and that information is used to advantage in some embodiments to generate test code. Java reflection is used to determine, for example, the return type of a method, the exceptions that a method may throw, and so on.

Exemplary embodiments of the kind illustrated in FIG. 4 include testing the software resource by use of the Java test code. In typical embodiments, testing the software resource includes passing (428) as a parameter to the Java test code at run time the JNDI name (432) for the JavaBean containing the software resource to be tested, logging in (434) to an application environment (436) by use of the user identification and the user password (reference 206 on FIG. 2), and looking up (438) the JavaBean home (440) by use of a JNDI home name for the software resource. In typical embodiments, testing the software resource further includes creating (442), by use of the JavaBean home, an instance of the JavaBean (450), invoking (448), in the created instance (450), the software resource to be tested, that is, the protected JavaBean method (446), and reporting (444) whether invoking the protected JavaBean method succeeded.

In embodiments of the kind under discussion, EJB member methods comprise the software resources to be tested. However, the EJB programming model requires some upfront work or drudgery to enable invoking such member methods. To invoke a method on an EJB, a reference to an EJB is needed. References to an EJB are obtained from the EJB's "home." References to an EJB's home is obtained by looking it up by JNDI name in some J2EE vendor supplied name space or directory, such as, for example, an LDAP directory.

More specifically, according to Sun System's J2EE EJB specification, an enterprise JavaBean's home interface defines the methods for a client to use to create, remove, and find EJB objects of the same type, that is, object implemented by the same enterprise JavaBean). The home interface is specified by a "Bean Provider" A Container creates a class that implements such a home interface. The home interface extends the 'javax.ejb.EJBHome' interface. A client can locate an enterprise JavaBean home interface through the standard Java Naming and Directory Interface™ ("JNDI") API.

In the J2EE environment generally, a "Deployer" is responsible for ensuring that all declared EJB references are bound to the homes of enterprise JavaBeans that exist in the operational environment. Deployers typically use, for example, the JNDI LinkRef mechanism to create a symbolic link to the actual JNDI name of the target enterprise JavaBean's home.

In typical embodiments of the kind illustrated, a client locates an entity JavaBean's home interface using JNDI. For example, the home interface for an "Account" entity JavaBean is located using the following illustrative exemplary pseudocode segment:

```
Context initialContext = new InitialContext( );
AccountHome accountHome = (AccountHome)
    javax.rmi.PortableRemoteObject.narrow(
    initialContext.lookup("java:comp/env/ejb/accounts"),
    AccountHome.class);
```

A client's JNDI name space in some typical exemplary embodiments is configured to include the home interfaces of enterprise JavaBeans deployed in multiple EJB Containers located on multiple machines on a network. The actual location of an EJB Container is typically transparent to a client.

As mentioned above, it is useful in generating EJB security test code to determine which EJB member methods are protected and which security role protects them. In addition, it is important to identify the Home interface used to construct or find an instance of an EJB. Also needed are the method signatures of the protected member methods and the Java Naming and Directory Interface (JNDI) name used to locate the homes in the name space for the protected EJB member methods.

In typical embodiments, J2EE application deployment descriptors, e.g., application.xml, and module deployment descriptor for EJB module, e.g., ejb-jar.xml, are used to discover items identify which EJB member methods are protected, the security roles that protect the member methods, and the Home interfaces used to construct or find instances of EJB comprising the protected member methods. The Java .class file(s) that implement the EJB and its Home interface are used to determine the method signatures of the protected methods. When embodiments generate EJB test code, know the name of the EJB module is known from the application.xml and the method-permission is known from the ejb-jar.xml file currently being processed. Given this information, test generation code in typical embodiments, then infers which EJB methods are protected, which roles protect them, and the Home interface of an EJB containing them, as illustrated in the following exemplary pseudocode:

```
// For this example, an XML Processor has already
// parsed the pertinent deployment descriptors into
// a tree structure in computer memory
Void infer_EJB_info(tree_pointer)
{
    For Each parsed EJB module in memory:
        Scan for <method-permission> elements;
    For Each <method-permission> element
    {
        Save the value of the <method-name> sub-element in
            VAR METHODNAME;
        Save the value of the <ejb-name> sub-element in VAR
            EJBNAME;
        Scan the EJB module in memory now for the
            <enterprise-beans> element and for nested <ejb-
            name> sub-elements that match the VAR
            EJBNAME
        For each match found:
        {
            Save the value of the <home> nested element
            Save the value of the <remote> nested element
            Save the value of the <ejb-class> nested element
            Use Java relection on the value of the <ejb-
                class> element and save the method
                signature for the method that matches
                VAR METHODNAME
        }
    }
}
```

Embodiments of this kind, having determined which EJB methods are protected, which roles protect them, and the Home interface of an EJB containing them, still need to determine the JNDI name used to locate the methods in the extended application name space. The JNDI name, however, is not usually defined until a J2EE application is deployed or installed and therefore is typically not available to be derived from deployment descriptors such as the ear file. For this reason, the JNDI name is typically supplied as a run time parameter when the generated test code is executed.

The generated Java test code will contain the necessary logic to find a Home interface in the JNDI directory, instruct the home interface to either create a new instance, or find an existing instance of an EJB, and finally try to invoke the protected method. More specifically, typical embodiments operate as illustrated in the following example pseudocode to authenticates a user, that is, login, look up a home interface, create an EJB instance from the home, and invokes the protected EJB method. In a similar fashion, and for similar reasons, as for the generated web test described above, in addition to the JNDI name, the user identity to authenticate access to the system also is supplied at run time to verify the role associated with the protected method.

```
// Input parameters are the user name (userID) and password
// of a member of the role protecting a URI and the JNDI name
// of the home to look up
protected void testProtectedEJBMethod( String userID,
                                       String password,
                                       String homeJNDIName)
{
// Authenticate or login the user
LoginHelper loginHelper = new LoginHelper( );
try
{
    // Provide the user's ID and password for authentication.
    org.omg.SecurityLevel2.Credentials credentials =
        loginHelper.login(userID, password);
    // Use the new credentials for all future invocations.
    loginHelper.setInvocationCredentials(credentials);
    // Retrieve the user's name from the credentials
    // so we can tell the user that login succeeded.
    String username = loginHelper.getUserName(credentials);
    System.out.println("Security context set for user: " +
        username);
}
catch (org.omg.SecurityLevel2.LoginFailed e)
{
    // Handle the LoginFailed exception.
}
// Lookup the home and then create an EJB instance
```

-continued

```
try
{
    SecFVTS1Home home = LookupHomeFromDirectory(
        homeJNDIName);
    SecFVTS1EJB ejb = home.create("SecFVTS1EJB");
}
catch (Exception e)
{
    fail("UnExpected exception during lookup or create:" + e1);
    e1.printStackTrace( );
    return;
}
// Finally, invoke the protected method
try
{
    ejb.doSomethingUseful( );
}
catch (Exception e)
{
    fail("UnExpected exception during EJB method invocation:" +
        e1);
    e1.printStackTrace( );
    return;
}
}
```

In light of the detailed description set forth, readers will observe that advantages of the use of typical embodiments of the present invention include that a test generator in the J2EE environment can have detailed knowledge of the sever side quality of service attributes expected of the enterprise application via the XML deployment descriptors, and a test generator could generate tests to explicitly test such attributes. It can potentially generate many different kinds of test each targeted at a specific aspect of quality or verification. For instance, correctness, load/stress test, reliability, long running tests, and so on.

This specification discusses in some detail typical embodiments of the invention as methods for generating test code with particular application to security-related QOS attributes. Other QOS attributes, as will occur to those of skill in the art, however, may be successfully addressed by use of the inventive methods and systems, including for example, tests for correctness, load/stress tests, reliability tests, long running tests, and so on, and addressing all such test subjects amenable to description in QOS attributes, is well within the scope of the present invention. In fact, it will be understood quite clearly from the descriptions in this specification that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A method of testing a J2EE application, wherein the J2EE application comprises modules, the method comprising the steps of:
    identifying (204), from an application deployment descriptor, modules comprised within the J2EE application;
    identifying, from an identified module, at least one QOS element;
    identifying, from the identified QOS element, a software resource to be tested;
    generating Java test code;
    identifying, for the software resource to be tested, a user identification and a user password for a user that is a member of a role intended to protect the software resource; and
    testing the software resource to be tested by use of the Java test code, including passing as parameters to the Java test code at run time the user identification and user password.

2. The method of claim 1 wherein:
    at least one of the identified modules comprises a web module having a web module deployment descriptor;
    at least one of the identified QOS elements comprises a security-constraint element;
    identifying a software resource to be tested further comprises constructing, from a <web-uri> element in the application deployment descriptor and from a <url-pattern> element in the web module deployment descriptor, a URI that identifies a software resource to be tested; and
    testing the software resource by use of the Java test code further comprises invoking the URI, wherein the invoking further comprises transmitting an HTTP request, wherein the HTTP request includes the URI, the user identification, and the user password.

3. The method of claim 2 wherein testing the software resource by use of the Java test code further comprises passing as a parameter to the Java test code at run time the URI.

4. The method of claim 2 wherein testing the software resource by use of the Java test code further comprises receiving an HTTP response.

5. The method of claim 4 wherein testing the software resource by use of the Java test code further comprises determining in dependence upon the HTTP response whether the software resource is protected.

6. The method of claim 1 wherein:
    at least one of the identified modules comprises an Enterprise JavaBean module ("EJB module") having a deployment descriptor;
    at least one of the identified QOS elements comprises a <method-permission> restraint element;
    the <method-permission> restraint element comprises:
        a first <method-name> sub-element having a first <method-name> sub-element value, and
        a first <ejb-name> sub-element having a first <ejb-name> sub-element value;
    the identified software resource to be tested comprises a JavaBean method;
    identifying a software resource to be tested comprises the further steps of:
        finding in a deployment descriptor for the identified EJB module one or more <enterprise-bean> elements having nested <ejb-name> sub-elements having values equal to the first <ejb-name> sub-elements value, wherein each found <enterprise-bean> element comprises:
            the nested <ejb-name> sub-element,
            a <home> nested sub-element,
            a <remote> nested sub-element, and
            an <ejb-class> nested sub-element; and
        identifying, for each found <enterprise-bean> element, a method signature having a method name equal to the first <method-name> sub-element value; and
    testing the software resource by use of the Java test code comprises the further steps of:
        looking up the JavaBean home by use of a JNDI home name for the software resource;
        creating, by use of the JavaBean home, an instance of the JavaBean; and invoking, in the created instance, the protected Java-Bean method.

7. The method of claim 6 wherein testing the software resource by use of the Java test code further comprises passing as a parameter to the Java test code at run time the JNDI name for the Javabean method.

8. The method of claim 6 wherein testing the software resource by use of the Java test code further comprises logging in to an application environment by use of the user identification and the user password.

9. The method of claim 6 wherein testing the software resource by use of the Java test code further comprises reporting whether invoicing the protected JavaBean method succeeded.

10. The method of claim 6 wherein identifying, for each found <enterprise-bean> element, a method signature having a method name equal to the first <method-name> sub-element value further comprises identifying, for each found <enterprise-bean> element, by use of Java reflection and the value of the <ejb-class> element, a method signature having a method name equal to the first <method-name> sub-element value.

11. A system of testing a J2BB application, wherein the J2EE application comprises modules, the system comprising:
means for identifying (204), from an application deployment descriptor, modules comprised within the J2EE application;
means for identifying, from an identified module, at least one QOS element;
means for identifying, from the identified QOS element, a software resource to be tested;
means for generating Java test code;
means for identifying, for the software resource to be tested, a user identification and a user password for a user tat is a member of a role intended to protect the software resource; and
means for testing the software resource to be tested by use of the Java test code, including means for passing as parameters to the Java test code at run time the user identification and user password.

12. The system of claim 11 wherein:
at least one of the identified modules comprises a web module having a web module deployment descriptor;
at least one of the identified QOS elements comprises a security-constraint element;
means for identifying a software resource to be tested further comprises means for constructing from a <web-uri> element in the application deployment descriptor and
from a <url-pattern> element in the web module deployment descriptor, a URI that identifies a software resource to be tested;
means for testing the software resource by use of the Java test code comprises:
means for invoking the URI wherein the means for invoking further comprises means for transmitting an HTTP request, wherein the HTTP request includes the URI, the user identification, and the user password.

13. The system of claim 12 wherein means for testing the software resource by use of the Java test code further comprises means for passing as a parameter to the Java test code at run time the URI.

14. The system of claim 12 wherein means for testing the software resource by use of the Java test code further comprises means for receiving an HTTP response.

15. The system of claim 14 wherein means for testing the software resource by use of the Java test code further comprises means for determining in dependence upon the HTTP response whether the software resource is protected.

16. The system of claim 11 wherein:
at least one of the identified modules comprises an Enterprise JavaBean module ("EJB module") having a deployment descriptor;
at least one of the identified QOS elements comprises a <method-permission> restraint element;
<the method-permission> restraint element comprises:
a first <method-name> sub-element having a first <method-name> sub-element value, and
a first <ejb-name> sub-element having a first <ejb-name> sub-element value;
the identified software resource to be tested comprises a JavaBean method;
means for identifying a software resource to be tested comprises:
means for finding in a deployment descriptor for the identified EJB module one or more <enterprise-bean> elements having nested <ejb-name> sub-elements having values equal to the first <ejb-name> sub-element value, wherein each found <enterprise-bean> element comprises:
the nested <ejb-name> sub-element,
a <home> nested sub-element,
a <remote> nested sub-element, and
an <ejb-class> nested sub-element; and
means for identifying, for each found <enterprise-bean> element, a method signature having a method name equal to the first <method-name> sub-element value; and
means for testing the software resource by use of the Java test code comprises:
means for looking up the JavaBean home by use of a JNDI home name for the software resource;
means for creating, by use of the JavaBean home, an instance of the JavaBean;
means for invoking, in the created instance, the protected JavaBean method.

17. The system of claim 16 wherein means for testing the software resource by use of the Java test code further comprises means for passing as a parameter to the Java test code at run time the JNDI name for the JavaBean method.

18. The system of claim 16 wherein means for testing the software resource by use of the Java test code further comprises means for logging in to an application environment by use of the user identification and the user password.

19. The system of claim 16 wherein means for testing the software resource by use of the Java test code further comprises means for reporting whether invoking the protected JavaBean method succeeded.

20. The system of claim 16 wherein means for identifying, for each found <enterprise-bean> element, a method signature having a method name equal to the first <method-name> sub-element value further comprises means for identifying, for each found <enterprise-bean> element, by use of Java reflection and the value of the <ejb-class> element, a method signature having a method name equal to the first <method-name> sub-element value.

21. A computer program product of testing a J2EE application, wherein the J2EE application comprises modules, the computer program product comprising:
a recording medium;
means, recorded on the recording medium, for identifying (204), from an application deployment descriptor, modules comprised within the J2EE application;

means, recorded on the recording medium, for identifying, from an identified module, at least one QOS element;

means, recorded on the recording medium, for identifying, horn the identified QOS element, a software resource to be tested;

means, recorded on the recording medium, fur generating Java test code;

means, recorded on the recording medium, for identifying, for the software resource to be tested, a user identification and a user password fur a user that is a member of a role intended to protect the software resource; and means, recorded on the recording medium, for testing the software resource to be tested by use of the lava test code, including means for passing as parameters to the Java test code at run time the user identification and user password.

22. The computer program product of claim 21 wherein:

at least one of the identified modules comprises a web module having a web module deployment descriptor;

at least one of the identified QOS elements comprises a security-constraint element;

means, recorded on the recording medium, for identifying a software resource to be tested further comprises means for constructing, from a <web-uri> element in the application deployment descriptor and from a <url-pattern> element in the web module deployment descriptor, a URI that identifies a software resource to be tested; and means, recorded on the recording medium, for testing the software resource by use of the Java test code comprises:

means, recorded on the recording medium, for invoking the URI wherein the means for invoking further comprises means for transmitting an HTTP request, wherein the HTTP request includes the URI, the user identification, and the user password.

23. The computer program product of claim 22 wherein means for testing the software resource by use of the Java test code further comprises means for passing the URI as a parameter to the Java test code at run time.

24. The computer program product of claim 22 wherein means for testing the software resource by use of the Java test code further comprises means for receiving an HTTP response.

25. The computer program product of claim 24 wherein means for testing the software resource by use of the Java test code further comprises means for determining in dependence upon the HTTP response whether the software resource is protected.

26. The computer program product of claim 21 wherein:

at least one of the identified modules comprises an Enterprise JavaBean module ("EJB module") having a deployment descriptor;

at least one of the identified QOS elements comprises a <method-permission> restraint element;

the <method-permission> restraint element comprises:

a first <method-name> sub-element having a first <method-name> sub-element value, and a first <ejb-name> sub-element having a first <ejb-name> sub-element value;

the identified software resource to be tested comprises a JavaBean method;

means, recorded on the recording medium, for identifying a software resource to be tested comprises:

means, recorded on the recording medium, for finding in a deployment descriptor for the identified EJB module one or more <enterprise-bean> elements having nested <ejb-name> sub-elements having values equal to the first <ejb-name> sub-clement value, wherein each found <enterprise-bean> element comprises:

the nested <ejb-name> sub-element, a <home> nested sub-element, a <remote> nested sub-element, and an <ejb-class> nested sub-element; and means, recorded on the recording medium, for identifying, for each found <enterprise-bean> element, a method signature having a method name equal to the first <method-name> sub-element value; wad means, recorded on the recording medium, for testing the software resource by use of the Java test code comprises:

means, recorded on the recording medium, for looking up the JavaBean home by use of a JNDI home name for the software resource;

means, recorded on the recording medium, for creating, by use of the JavaBean home, an instance of the JavaBean;

means, recorded on the recording medium, for invoking, in the created instance, the protected JavaBean method.

27. The computer program product of claim 26 wherein means for testing the software resource by use of the Java test code further comprises means, recorded on the recording medium, for passing as a parameter to the Java test code at run time the JNDI name for the JavaBean method.

28. The computer program product of claim 26 wherein means for testing the software resource by use of the Java test code further comprises means, recorded on the recording medium, for logging in to an application environment by use of the user identification and the user password.

29. The computer program product of claim 26 wherein means for testing the software resource by use of the Java test code further comprises means, recorded on the recording medium, for reporting whether invoking the protected JavaBean method succeeded.

30. The computer program product of claim 26 wherein means for identifying, for each found <enterprise-bean> element, a method signature having a method name equal to the first <method-name> sub-element value further comprises means for identifying, recorded on the recording medium, for each found <enterprise-bean> element, by use of Java reflection and the value of the <ejb-class> element, a method signature having a method name equal to the first <method-name> sub-element value.

* * * * *

UNITED STATES PATENT AND TRADEMARK OFFICE
CERTIFICATE OF CORRECTION

PATENT NO. : 6,826,716 B2
DATED : November 30, 2004
INVENTOR(S) : Carlton Keith Mason It is certified that error appears in the above-identified patent and that said Letters Patent is hereby corrected as shown below:

Column 17,
Line 36, "tat" should be changed to -- that --.

Column 19,
Line 5, "horn" should be changed to -- from --;
Line 7, "fur" should be changed to -- for --;
Line 11, "fur" should be changed to -- for --;
Line 15, "lava" should be changed to -- Java --.

Column 20,
Line 22, "wad" should be changed to -- and --.

Signed and Sealed this

Tenth Day of May, 2005

JON W. DUDAS
*Director of the United States Patent and Trademark Office*